(12) United States Patent
Reich

(10) Patent No.: US 11,417,871 B2
(45) Date of Patent: Aug. 16, 2022

(54) PRODUCING ELECTRODES FOR LEAD ACID BATTERIES

(71) Applicant: Clarios Germany GmbH & Co. KGAA, Hannover (DE)

(72) Inventor: Tatjana Reich, Neustadt (DE)

(73) Assignee: Clarios Germany GmbH & Co. KG, Hannover (DE)

( * ) Notice: Subject to any disclaimer, the term of this patent is extended or adjusted under 35 U.S.C. 154(b) by 55 days.

(21) Appl. No.: 16/571,808

(22) Filed: Sep. 16, 2019

(65) Prior Publication Data

US 2020/0119335 A1 Apr. 16, 2020

Related U.S. Application Data

(63) Continuation of application No. 14/390,980, filed as application No. PCT/EP2013/056034 on Mar. 22, 2013, now Pat. No. 10,418,623.

(30) Foreign Application Priority Data

Mar. 22, 2012 (DE) .......................... 102012102461

(51) Int. Cl.
*H01M 4/22* (2006.01)
*B22D 11/00* (2006.01)
(Continued)

(52) U.S. Cl.
CPC ............. *H01M 4/22* (2013.01); *B22D 11/001* (2013.01); *B22D 11/009* (2013.01);
(Continued)

(58) Field of Classification Search
None
See application file for complete search history.

(56) References Cited

U.S. PATENT DOCUMENTS 3,789,910 A 2/1974 Matter et al.
3,947,936 A * 4/1976 Wheadon ............. B21D 31/043
29/2
(Continued)

FOREIGN PATENT DOCUMENTS

DE 10209138 9/2003
DE 102008055775 A1 * 5/2010 ............. H01M 4/16
(Continued)

OTHER PUBLICATIONS

CN 201380014463.7 Chinese First Office Action dated Mar. 23, 2016.
(Continued)

*Primary Examiner* — Gregg Cantelmo
(74) *Attorney, Agent, or Firm* — Boardman & Clark LLP

(57) ABSTRACT

A system for producing electrodes for lead-acid batteries is disclosed. An electrode that has been produced comprises at least one upper and/or one lower frame element as well as a lattice-shaped region that extends away from said upper or lower frame element and has a plurality of openings, the upper and/or lower frame element being of a greater thickness than the lattice-shaped region. Said system comprises the steps of: a) producing a profiled strip-shaped blank using a casting method in which the strip-shaped blank is formed, solely by means of said casting method, to have a greater thickness on one side in at least one of the regions which should eventually form the upper or lower frame element, than the thickness in regions which should eventually form the lattice-shaped region, and b) producing said lattice-shaped region with the openings in a subsequent expanded metal process.

7 Claims, 4 Drawing Sheets

(51) Int. Cl.
*B22D 11/04* (2006.01)
*B22D 25/04* (2006.01)
*H01M 4/73* (2006.01)
*H01M 4/74* (2006.01)
*H01M 4/84* (2006.01)
*H01M 4/14* (2006.01)
*H01M 10/12* (2006.01)

(52) U.S. Cl.
CPC .......... *B22D 11/0406* (2013.01); *B22D 25/04* (2013.01); *H01M 4/14* (2013.01); *H01M 4/73* (2013.01); *H01M 4/745* (2013.01); *H01M 4/84* (2013.01); *H01M 10/125* (2013.01); *Y10T 29/49108* (2015.01); *Y10T 29/53135* (2015.01)

(56) References Cited

U.S. PATENT DOCUMENTS

| | | | |
|---|---|---|---|
| 4,196,757 A | 4/1980 | Hug et al. | |
| 4,221,032 A | 9/1980 | Cousino et al. | |
| 4,305,187 A * | 12/1981 | Iwamura | H01M 4/745 |
| | | | 29/2 |
| 4,349,067 A | 9/1982 | Wirtz | |
| 5,082,746 A | 1/1992 | Forward et al. | |
| 5,411,821 A | 5/1995 | Feldstein | |
| 5,616,425 A * | 4/1997 | Wilde | B21B 1/088 |
| | | | 428/682 |
| 5,948,566 A * | 9/1999 | Larsen | H01M 4/745 |
| | | | 429/225 |
| 6,212,744 B1 | 4/2001 | Inanobe et al. | |
| 6,797,403 B2 | 9/2004 | Clark et al. | |
| 8,807,201 B2 | 8/2014 | Franz et al. | |
| 10,418,623 B2 | 9/2019 | Reich | |
| 2001/0042288 A1* | 11/2001 | Omae | H01M 4/745 |
| | | | 29/2 |
| 2011/0212368 A1* | 9/2011 | Streuer | H01M 4/73 |
| | | | 429/241 |
| 2013/0174704 A1 | 7/2013 | Farina | |
| 2014/0363742 A1 | 12/2014 | Wetzel et al. | |

FOREIGN PATENT DOCUMENTS

| | | | | |
|---|---|---|---|---|
| DE | 102008055775 A1 | | 5/2010 | |
| DE | 102009030793 A1 | | 12/2010 | |
| EP | 0622161 A1 * | | 11/1994 | .......... B01D 29/111 |
| EP | 0622161 A1 | | 11/1994 | |
| EP | 0976474 | | 2/2000 | |
| JP | 08213024 H | | 8/1996 | |
| JP | 2002170570 | | 6/2002 | |

OTHER PUBLICATIONS

CN 201380014463.7 Second Office Action dated Nov. 15, 2016.
EP 13712215.6 Office Action dated Dec. 23, 2016.

* cited by examiner

PRODUCING ELECTRODES FOR LEAD ACID BATTERIES

CROSS REFERENCE TO RELATED APPLICATIONS

This application is a Continuation of U.S. patent application No. 14/390,980, filed Oct. 6, 2014, entitled "PRODUCING ELECTRODES FOR LEAD-ACID BATTERIES", now U.S. Pat. No. 10,418,623, which is a National Stage Entry of PCT/EP2013/056034, filed Mar. 22, 2013, entitled "PRODUCING ELECTRODES FOR LEAD-ACID BATTERIES", which claims priority to German Patent Application 10 2012 102 461.8, filed Mar. 22, 2012, entitled "PROCESS FOR THE PRODUCTION OF ELECTRODES FOR LEAD-ACID BATTERIES, ELECTRODE AND LEAD-ACID BATTERY PRODUCED THEREAFTER".

BACKGROUND AND SUMMARY

In general, the invention relates to the field of manufacturing electrodes for lead-acid batteries, particularly negative electrodes. There have already been proposals made, e.g. in EP 1 366 532 B1 or DE 1 02 09 1 38 B4, for using an extrusion press machine to continuously manufacture a lead alloy strip. However, extruding machines of this type are relatively complex and in particular require an extruder.

The invention is based on the objective of specifying simplified possibilities for manufacturing electrodes for lead-acid batteries which can be realized more economically.

The objective is accomplished by a method for manufacturing electrodes for lead-acid batteries in accordance with claim 1, wherein a produced electrode has at least one upper and/or one lower frame element as well as a meshed region extending away from the upper and/or lower frame element and comprising a plurality of openings, whereby the upper and/or the lower frame element is thicker than the meshed region, said method comprising the steps of:
a) producing a profiled strip blank in a casting process, wherein only by means of the casting process is the strip blank formed to be thicker on one side in at least one of the regions which will ultimately form the upper or lower frame element than in the regions which are to ultimately form the meshed region,
b) producing the meshed region having the openings in a subsequent expanded metal process.

The invention has the advantage of being able to produce robust electrodes for lead-acid batteries at particularly low manufacturing cost. Designing the upper and/or lower frame element to have a greater thickness produces electrodes which are more mechanically robust than is the case with conventional manufacturing processes. This is in turn made possible by the producing of a profiled strip blank, which known casting methods would enable. In particular, the relationship between electrode quality and manufacturing cost becomes considerably more favorable. The method according to the invention is particularly advantageous even given higher raw material costs, e.g. for the lead, since there is no punching waste in the expanded metal process as created in punching processes. There is thus also no expense for subsequent collection and recycling of punching waste as it is never created in the first place. The combination of the expanded metal process and the casting process, particularly without an extruding step, enables electrodes to be manufactured particularly quickly, which has the advantage of being able to use existing machines particularly efficiently.

The electrode can be configured either with only an upper frame element, with only a lower frame element or with an upper frame element and a lower frame element. When the electrode has both the upper as well as the lower frame element, one advantageous embodiment provides for the meshed region to extend from the upper to the lower frame element. The manufacturing process allows the electrode to initially be produced with both the upper and the lower frame element as need be and then ultimately, particularly after carrying out the expanded metal process, one of the frame elements to be cut away. This gives the electrode increased robustness during the manufacturing process which is conducive to said manufacturing process. Additionally, there is a material savings in the end due to cutting away a frame element.

The strip blank formed in the casting process is thicker on one side in the regions which will ultimately form the upper and/or lower frame element of greater thickness than in the regions which will ultimately form the meshed region. In one advantageous configuration, the upper side of the blank as it exits from the casting process is thereby substantially planar; i.e. smooth, while its underside exhibits a profile comprising the regions of less and the regions of greater thickness. In so doing, a profiled strip blank can be produced without the need for an extruder.

The resulting electrode is also asymmetrical; i.e. it exhibits a greater thickness on one side in the region of the upper and/or the lower frame element than in the meshed region. This results in material savings in the meshed region, which leads to more favorable manufacturing costs and to lower weight.

According to one advantageous further development of the invention, the casting process is a continuous casting process in which the strip blank is produced continuously. The continuous casting process allows the economical and time-saving manufacture of basically any length of strip-shaped blanks and thus the economical manufacture of the battery electrodes at high production speed and high quantities.

According to one advantageous further development of the invention, the electrodes are manufactured without an extruding step; i.e. without using an extruder.

According to one advantageous further development of the invention, the strip blank produced in the casting process is of lesser width than the width of the electrode resulting after the expanded metal process.

According to one advantageous further development of the invention, the region of the strip blank which is ultimately to form the meshed region initially has no openings in step a).

According to one advantageous further development of the invention, it is provided for cutting blades to first provide longitudinal slots in the strip blank in the area of the meshed region to be produced during the expanded metal process; i.e. slots extending in the longitudinal direction of the blank, and to thereafter produce the meshed region by drawing the slotted blank transverse to the direction of the longitudinal extension of the upper and/or lower frame element. If the slotted blank exhibits both the lower as well as the upper frame element at this point in time, the meshed region can be produced by drawing of the slotted blank in that the upper and the lower frame element are pulled apart in opposite directions. This exerts a tensile force on the slotted blank in a direction transverse to the longitudinal direction, which ultimately leads to the meshed region being formed with rhombic openings.

According to one advantageous further development of the invention, the strip blank is produced with at least one first, one second and one third region each extending in the longitudinal direction of the strip blank, at least one of which is of greater thickness, and closed material areas without openings and of lesser thickness are produced between each first and second as well as between each second and third region. Particularly the regions of increased thickness can hereby be asymmetrically formed on one side and this done in the course of producing the profiled strip blank in the casting process. No extruder is required here as well. Advantageously, to save material, only e.g. the second (middle) region can be of increased thickness. All three regions; i.e. the first, second and third region, can also for example be formed with increased thickness.

According to one advantageous further development of the invention, electrode contact tabs are produced out of the second region of increased thickness; e.g. by punching out specific excess areas of the second region. This has the advantage of the electrodes being able to be continuously produced as quasi double-band electrodes and the casting process thereby already integrating the material for the contact tabs at the same time. According to one advantageous further development, the second region of increased thickness is situated between first and the third region of increased thickness.

According to one advantageous further development of the invention, a strip-shaped electrode assembly, which is wound into a coil, is produced from the strip blank in a continuous expanded metal process. A coil is to be understood as a helically wound object. This has the advantage of the electrodes already being able to be largely prepared for later use in batteries, including realizing the expanded metal process. The electrode assembly is comparatively more sensitive to mechanical influences after the expanded metal process being realized. It is therefore advantageous for the already drawn strip-shaped electrode assembly to be wound into a coil. The strip-shaped electrode assembly is less sensitive to mechanical influences in this coiled form and can additionally be easily used for further production steps in the manufacturing of batteries.

The non-profiled flat side of the electrodes can be on the outside when coiling. According to one advantageous further development of the invention, the non-profiled flat side of the electrodes is on the inside during coiling. By so doing, the coiled electrode assembly can be stored so as to be particularly insensitive to mechanical influences.

According to one advantageous further development of the invention, the strip-shaped electrode assembly is first pasted with a pasty active material and then wound into a coil.

According to one advantageous further development of the invention, the electrode is pasted with pasty active material after the expanded metal process and, when applicable, prior to detaching from the strip-shaped electrode assembly. The electrode can thereafter be provided with separator material and inserted into the housing of a lead-acid battery so as to ultimately produce a lead-acid battery.

According to one advantageous further development of the invention, the electrode is initially stored prior to being pasted with the pasty active material and the pasting process conducted after a storage period. This has the advantage of being able to divide the sub-processes of "production of raw electrodes" and "finalizing electrochemically active electrodes" into separate steps which can be realized independently of each other, particularly at different times. Since the two method steps can be realized at different speeds, a suitable dissociating can thereby be made between the sub-processes which allows adapting the overall manufacturing process to the speed of the sub-processes.

According to one advantageous further development of the invention, the electrodes can be stored in coil form.

The objective cited at the outset is further accomplished by a system for manufacturing electrodes for lead-acid batteries, whereby the system is configured to realize a method in accordance with any one of the preceding claims, wherein an electrode produced with the system exhibits at least one upper and/or one lower frame element as well as a meshed region extending away from said upper and/or lower frame element which comprises a plurality of openings, wherein the upper and/or lower frame element is thicker than the meshed region, with the system components of:

a) a casting system designed to produce a profiled strip blank to be thicker on one side in the regions which are to ultimately form the upper and/or lower frame element than in the regions which are to ultimately form the meshed region, b) an expanded metal press designed to produce the meshed region having the openings by way of an expanded metal process.

The system can be designed without an extruder.

The objective cited at the outset is additionally accomplished by an electrode manufactured in accordance with one of the above described methods. The electrode can be used in a lead-acid battery as a positive or a negative electrode.

The objective cited at the outset is further accomplished by a lead-acid battery having one or more of the above-cited electrodes.

BRIEF DESCRIPTION OF THE DRAWINGS

The following will reference the drawings in describing embodiments of the invention in greater detail.

Shown are

The figures use the same reference numerals for elements which correspond to one another.

DETAILED DESCRIPTION

Figure 1:
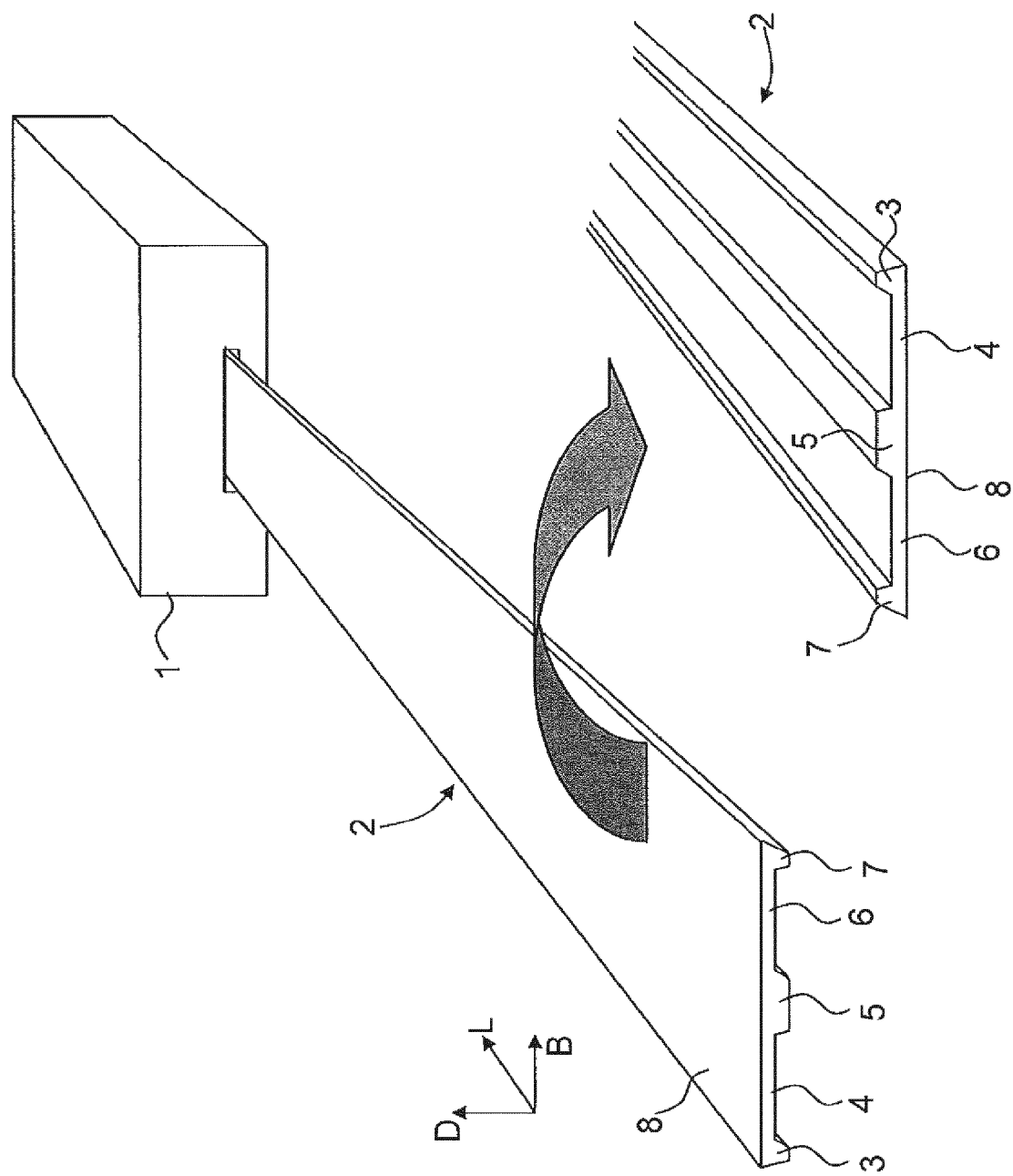
FIG. 1 the production of a strip-shaped blank.

FIG. 1 shows a casting system 1 which produces a strip-shaped blank 2 for electrodes of lead-acid batteries by means of a continuous casting process. The casting system 1 is supplied with lead on the input side (not shown). The casting system 1 melts the lead and dispenses the strip blank 2 as a continuous profiled mold in the extruded form shown in FIG. 1 on the output side. The strip blank 2 can then be further processed as described below.

The distinctiveness of the casting system 1 according to FIG. 1 is that the strip blank 2 can be produced with a profile on one side such that the blank 2 exhibits different thicknesses D across its width B. It can be seen from FIG. 1 that the blank 2 exiting the casting system 1 has a substantially flat, smooth upper side 8 and a profiled underside. The blank 2 comprises regions 3, 5, 7 of greater thickness D than the regions 4, 6 situated therebetween. The regions 3, 5, 7 of greater thickness D project above regions 4, 6 on the underside. On the right, FIG. 1 shows a section of the strip blank 2 turned 180° about its longitudinal axis to show the profiled underside more visibly, illustrating the one-sided profile structure of the strip blank 2 extending in longitudinal direction L.

Depending on embodiment, it is also conceivable for only the middle region 5 to exhibit increased thickness D.

The casting machine 1 is thereby configured wholly without an extrusion unit; i.e. it effects purely a casting process without an extruding step.

As will be described below, the regions 4, 6 of lesser thickness will be trans-formed into the meshed region by an expanded metal process, the upper and the lower frame element as well as part of the electrode contact tabs will be produced from the regions 3, 5, 7 of greater thickness.

Figure 2:
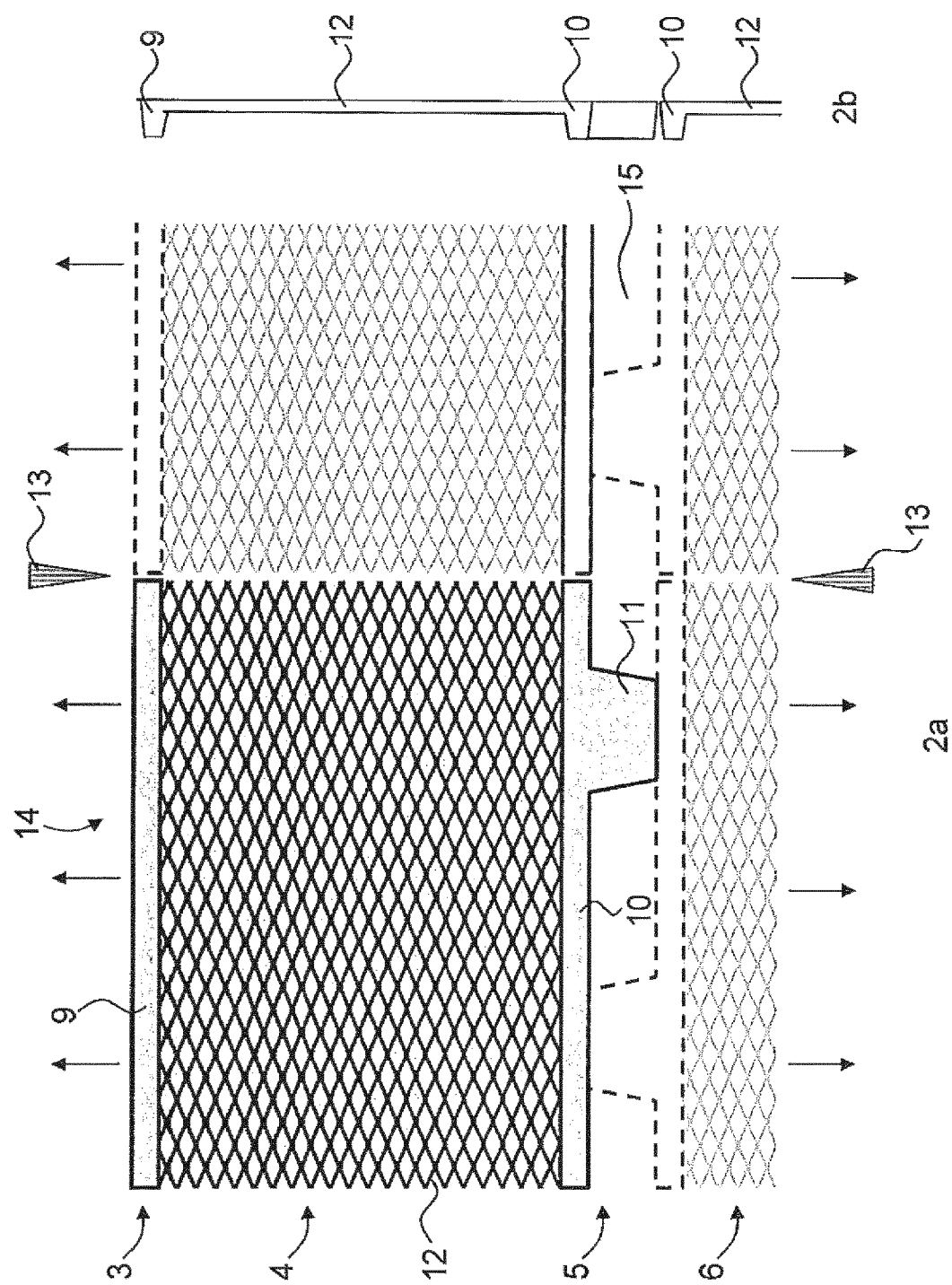
FIG. 2 an electrode.

FIG. 2 shows a top plan view of an electrode 14 subsequent the expanded metal process in FIG. 2a. To illustrate the relationship to the strip blank 2, the electrode 14 is depicted with additional electrodes which are only partially reproduced at lower contrast or by dotted lines.

As can be recognized, the electrode 14 comprises an upper frame element 10 with a contact tab 11 formed thereon, a lower frame element 9 and a meshed region 12 extending between the upper and the lower frame element 9, 10. To illustrate the relationship to the strip blank 2 according to FIG. 1, the corresponding reference numerals for the regions of the blank 2 from FIG. 1 are additionally reproduced.

The arrows shown in FIG. 2a respectively pointing away from the upper frame element 10 and the lower frame element 9 indicate the direction of the drawing force to act on the electrodes 14 in the expanded metal process.

Individual electrodes 14 are detached from the electrode strip exiting after the expanded metal process by individual electrodes being cut out, as represented by the triangles 13 in FIG. 2a. Correspondingly, the contact tabs 11 are also detached from the upper frame element 10 of the respective oppositely situated electrode. The interstices 15 between the contact tabs 11 are produced by die cutting.

FIG. 2 shows a side view of the produced electrode 14 on the right in FIG. 2b, from which the profiled structure is recognizable.

Figure 3:
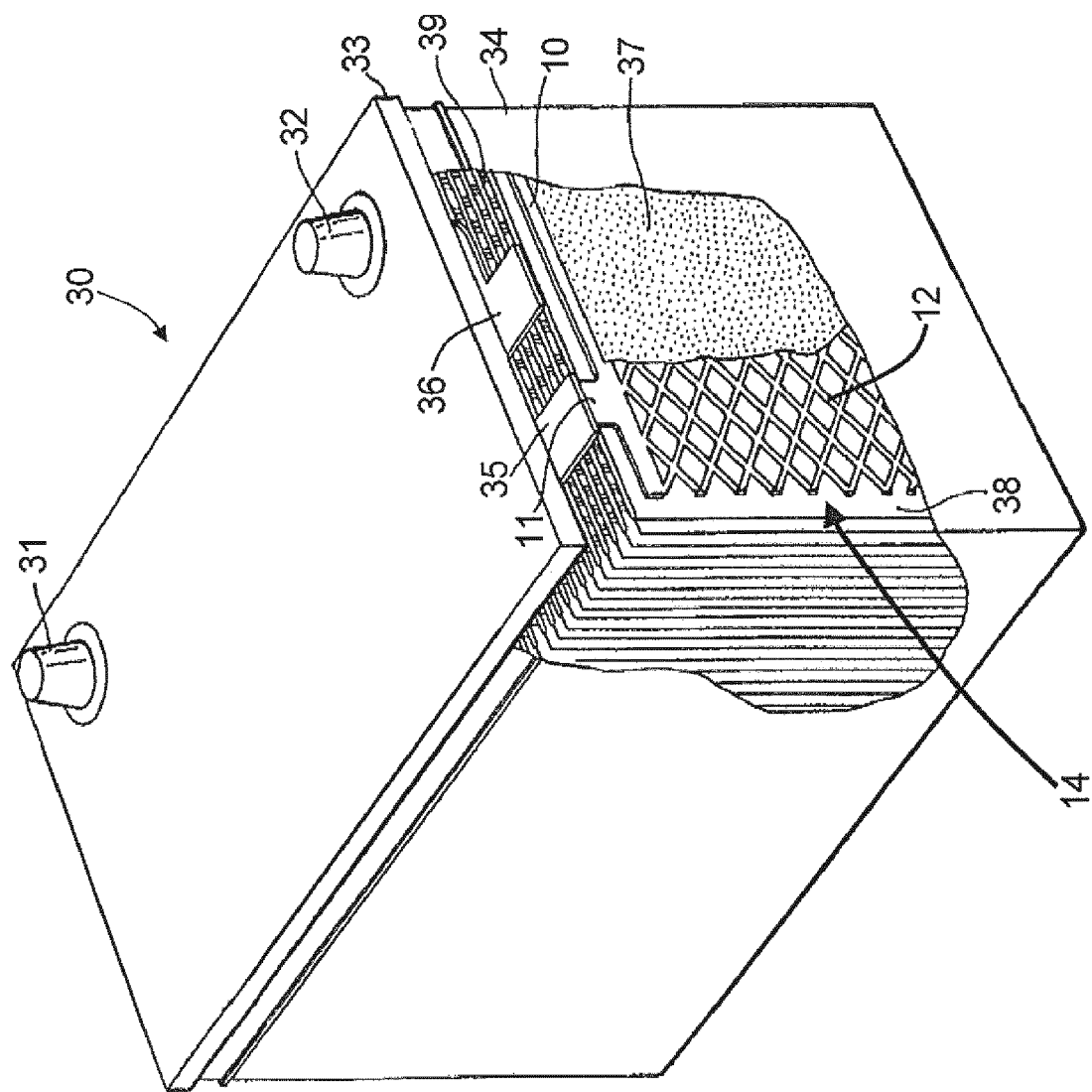
FIG. 3 a lead-acid battery.

FIG. 3 shows a lead-acid battery 30 comprising a plurality of electrodes 14 of the type described above. The lead-acid battery 30 comprises a cover part 33 having external terminals 31, 32. The external terminals 31, 32 are respectively connected to positive/negative electrodes via the respective electrode connector 35, 36. For example, the connection of a negative electrode connector 35 to a contact tab 11 of an electrode 14 which in the present case is used as a negative electrode is recognizable. The negative electrode connector 35 is connected to the further negative electrodes and to terminal 31. Analogously, the positive electrode connector 36 is connected to the contact tabs of the positive electrodes 39 and to the other terminal 32.

The lead-acid battery 30 comprises a lower housing part 34 in which the electrodes 14, 39 are disposed. The electrodes 14, 39 are provided with a pasty active material 37. The electrodes 14, 39 together with the pasty active material 37 are additionally respectively enveloped by a separator material 38.

Figure 4:
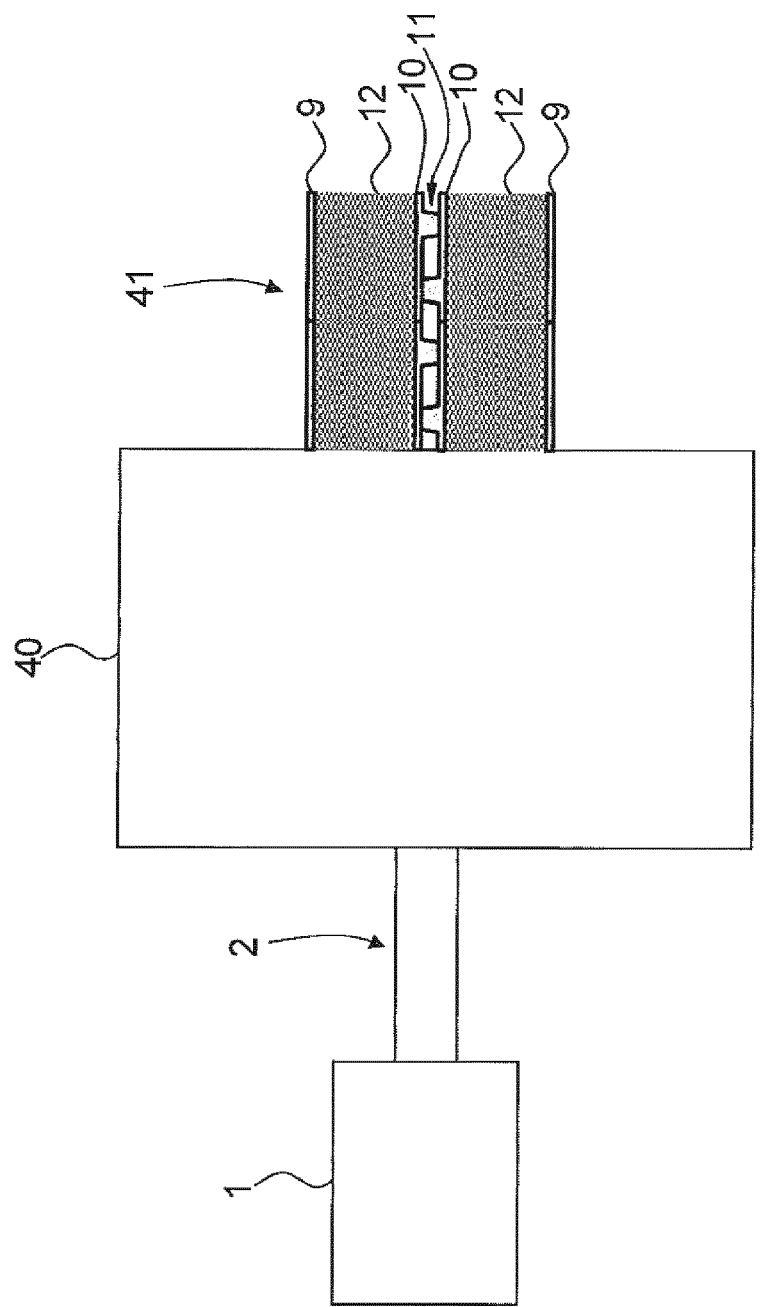
FIG. 4 a system for manufacturing electrodes for lead-acid batteries.

FIG. 4 shows an example of a system for manufacturing electrodes for lead-acid batteries of the type described above. The casting system 1 is again recognizable as the first system component. The above-described strip blank 2 exits from the casting system 1. The strip blank 2 is fed to an expanded metal press 40 which represents the second system component. The expanded metal press 40 first comprises a cutting unit which for example has cutting blades attached to a rotary roller. The cutting blades cut short longitudinal slots, e.g. just a few millimeters in length, into the strip-shaped blank in regions 4, 6. After the strip blank has passed through the cutting unit, it is fed to a drawing device of the expanded metal press 40. The drawing process is realized in the drawing device by the frame elements 9, 10 being pulled apart in opposite directions as shown in FIG. 1 by the arrows of FIG. 2a.

Lastly, the blank is fed to a punching section in the expanded metal press 40 in which the clear regions 15 between the contact tabs 11 are punched out. The electrode strip 41 ultimately exiting the machine 40, as depicted in FIG. 4, corresponds to the electrode strip as described with reference to FIG. 2.

The invention claimed is:

1. A system for manufacturing electrodes for lead-acid batteries,
wherein the electrodes produced with the system includes
an upper frame element, a lower frame element, or the upper frame element and the lower frame element,
a meshed region extending away from the upper frame element and/or the lower frame element, the meshed region having a plurality of openings,
wherein the upper frame element and/or the lower frame element is of greater thickness than the meshed region,
the system consisting essentially of:
a continuous casting system which alone is to produce a continuous profiled strip blank having a non-profiled side and a profiled side, the non-profiled side being flat, the profiled side having a greater thickness along a longitudinal length in a first region than in a second region, the first region is to form the upper frame element or the lower frame element and the second region is to form the meshed region, wherein lead is supplied to an input side of the continuous casting system, the lead is to be melted with the continuous casting system, and the continuous profiled strip blank is dispensed by the continuous casting system from an output side;
an expanded metal, press to receive the continuous profiled strip blank and designed to produce the meshed region having the openings by way of an expanded metal process to yield an electrode strip; and
a cutter to receive the electrode strip from the expanded metal press and to cut out therefrom individual electrodes.

2. The system of claim 1, wherein the expanded metal press comprises:
a cutting device to cut longitudinal slots in the second region; and
a drawing device to pull the cut blank in opposite directions to expand the longitudinal slots.

3. The system of claim 2, wherein the expanded metal press further comprises a punching device to punch the first region to create contact tabs.

4. The system of claim 1, wherein the electrodes produced with the system includes the upper frame element and the lower frame element, wherein the profiled side has a greater thickness along the longitudinal length in a third region than in the second region, and wherein the first region is to form the upper frame element and the third region is to form the lower frame element.

5. The system of claim 1, wherein a first portion of the continuous profiled strip blank corresponds to a first electrode and a second portion of the continuous profiled strip blank corresponds to a second electrode.

6. The system of claim 1, wherein the continuous profiled strip blank is produced with the first region, the second region, a third region, a fourth region, and a fifth region extending in a longitudinal direction of the continuous profiled strip blank, wherein the continuous profiled strip blank is also produced with closed material areas, and wherein the profiled side has a greater thickness along a longitudinal length in the first, third, and fifth regions than in the second and fourth regions.

7. The system of claim 6, wherein the first region is to form the lower frame element of a first electrode, the second region is to form the meshed region of the first electrode, the fourth region is to form the meshed region of a second electrode, the fifth region is to form the lower frame element of the second electrode, and the third region is to form the upper frame element of the first electrode and the upper frame element of the second electrode.

* * * * *

UNITED STATES PATENT AND TRADEMARK OFFICE
CERTIFICATE OF CORRECTION

PATENT NO. : 11,417,871 B2
APPLICATION NO. : 16/571808
DATED : August 16, 2022
INVENTOR(S) : Tatjana Reich It is certified that error appears in the above-identified patent and that said Letters Patent is hereby corrected as shown below:

In the Specification

1. In Column 5, Line 11, delete "trans-formed" and insert -- transformed --, therefor.

In the Claims

2. In Column 6, Line 43, in Claim 1, delete "metal," and insert -- metal --, therefor.

Signed and Sealed this
Ninth Day of April, 2024

Katherine Kelly Vidal
*Director of the United States Patent and Trademark Office*